(12) United States Patent
Shi et al.

(10) Patent No.: US 10,541,550 B2
(45) Date of Patent: Jan. 21, 2020

(54) SWITCHING POWER CONVERTER FOR DIRECT BATTERY CHARGING

(71) Applicant: Dialog Semiconductor Inc., Campbell, CA (US)

(72) Inventors: Fuqiang Shi, Campbell, CA (US); Jianming Yao, Campbell, CA (US); Yong Li, Campbell, CA (US); Kai-wen Chin, Campbell, CA (US); Cong Zheng, Campbell, CA (US)

(73) Assignee: Dialog Semiconductor Inc., Campbell, CA (US)

( * ) Notice: Subject to any disclaimer, the term of this patent is extended or adjusted under 35 U.S.C. 154(b) by 41 days.

(21) Appl. No.: 15/604,449

(22) Filed: May 24, 2017

(65) Prior Publication Data

US 2017/0346329 A1  Nov. 30, 2017

Related U.S. Application Data

(60) Provisional application No. 62/341,621, filed on May 25, 2016.

(51) Int. Cl.

| H02J 7/00 | (2006.01) |
| H02M 3/00 | (2006.01) |
| H02J 7/02 | (2016.01) |
| H02J 7/04 | (2006.01) |
| H02M 3/158 | (2006.01) |
| H02M 3/335 | (2006.01) |

(52) U.S. Cl.
CPC .............. *H02J 7/022* (2013.01); *H02J 7/007* (2013.01); *H02J 7/0052* (2013.01); *H02J 7/0077* (2013.01); *H02J 7/045* (2013.01); *H02M 3/1588* (2013.01); *H02M 3/3353* (2013.01); *H02M 3/33546* (2013.01); *H02M 3/33569* (2013.01); *H02M 3/33592* (2013.01); *H02J 2007/0059* (2013.01); *H02J 2007/0062* (2013.01); *H02J 2007/0096* (2013.01)

(58) Field of Classification Search
None
See application file for complete search history.

(56) References Cited

U.S. PATENT DOCUMENTS

| 8,854,842 | B2 * | 10/2014 | Zheng | H02M 3/33576 |
| | | | | 363/21.13 |
| 9,331,587 | B2 * | 5/2016 | Djenguerian | H02M 3/33523 |
| 9,331,589 | B2 * | 5/2016 | Shi | H02M 3/33523 |
| 9,543,844 | B2 * | 1/2017 | Gong | H02M 3/33523 |
| 9,780,666 | B2 * | 10/2017 | Odell | H02M 3/33507 |
| 9,893,626 | B2 * | 2/2018 | Wang | H02M 3/33507 |
| 2014/0254215 | A1 * | 9/2014 | Brinlee | H02M 3/33507 |
| | | | | 363/21.15 |
| 2015/0280573 | A1 * | 10/2015 | Gong | H02M 3/33523 |
| | | | | 363/21.14 |
| 2016/0190938 | A1 * | 6/2016 | Wang | H02M 3/33507 |
| | | | | 363/21.12 |
| 2016/0294289 | A1 * | 10/2016 | Bui | G06F 1/266 |

\* cited by examiner

*Primary Examiner* — Leigh M Garbowski
(74) *Attorney, Agent, or Firm* — Haynes and Boone, LLP

(57) ABSTRACT

A direct charging method is provided that alerts a mobile device when a switching power converter is operating in a constant-current mode to alert the mobile device of an output current without the use of a secondary-side current sense resistor.

14 Claims, 6 Drawing Sheets

SWITCHING POWER CONVERTER FOR DIRECT BATTERY CHARGING

CROSS-REFERENCE TO RELATED APPLICATIONS

This application claims the benefit of U.S. Provisional Application No. 62/341,621, filed May 25, 2016.

TECHNICAL FIELD

This application relates to charging batteries, and more particularly to circuits and techniques for directly charging batteries with a flyback converter.

BACKGROUND

Battery-powered devices such as a cellular telephone offer freedom and mobility by allowing users the ability to operate devices without being connected to a power grid. As these devices integrate more features and push for higher performance, they consume more power and require longer battery life. The amount of charge required to recharge the battery thus increases but the longer the recharge time, the less useful a mobile device becomes. Thus, reducing the charging time of battery-powered devices increases the use and benefit of such devices.

It is conventional for a mobile device such as a cellular telephone to be charged through a data interface cable such as a Universal Serial Bus (USB) cable. A USB cable has a current limit that cannot be exceeded for safety reasons. A power adapter such as a flyback converter that drives the USB cable to recharge the mobile device's battery must thus not exceed the current limit, which undesirably lengthens the charging time. To decrease the charging time despite the current limits of USB cables, certain fast charging protocols have been developed in which the output voltage driven from the power converter through the USB cable is elevated from a default level (for example, from 5V to 9V or 12V etc.) to deliver higher power without increasing the current above the charging cable limits. But such increased voltages require the mobile device to include a DC-DC converter to reduce the received voltage to a suitable level for battery charging. The DC-DC converter generates heat that limits the charging time reduction. In addition, the mobile device manufacturing cost is increased by the inclusion of the DC-DC converter.

To eliminate the need for a DC-DC converter in the mobile device, direct charging techniques have been developed in which the flyback converter directly charges the battery of the mobile device. The mobile device thus either does not include such an intervening DC-DC switching power converter or bypasses its use during a direct charging mode. In addition, modem USB cable current limits have been increased to, e.g., 4 Amps such that direct charging offers a desirably decreased charging time. A direct charging of a discharged battery typically proceeds over three phases. In a first phase, the battery voltage is low such that the direct charging occurs in a constant-current mode that drives the battery with the maximum allowable current over the USB cable (e.g., 4 A). The discharged battery's voltage gradually rises over the first phase until it reaches a battery voltage limit such as 4.3 V. The direct battery charging then enters a second phase involving a series of constant-current modes in which the current limit is successively decreased in steps from the USB current limit to a minimum reduced minimum current such as 2 A. With each reduction in the current limit, the battery voltage first drops and then increases until it reaches the voltage maximum, whereupon a lower current limit is enforced. When the battery voltage again reaches the voltage maximum with the current limit at the minimum limit for the second phase, the direct battery charging procedure enters into a third phase of constant voltage operation at the voltage maximum. The current slowly decreases during the third phase until the battery is fully charged.

But modern smartphones tend to be quite expensive such that it would be disastrous if the power adapter damages the smartphone's battery during the direct charging process. In that regard, the output voltage and output current from the power adapter must typically be closely monitored during the direct charging process. The output voltage may be monitored by the flyback converter's secondary-side controller using an analog-to-digital converter (ADC). But the monitoring of the output current typically requires the use of a sense resistor in series with the transformer's secondary winding so that the output current may be sensed by an ADC and reported to the mobile device. Given the high output currents (e.g. 4 A) used in direct charging, even a very small resistance (e.g., in the tens of mill-ohms) for the sense resistor introduces a significant power loss.

Thus there is a need in the art for flyback converters configured for direct charging without the use of a secondary-side sense resistor.

SUMMARY

To eliminate the need for a secondary-side sense resistor, a direct charging scheme is provided in which the secondary-side controller is configured to detect whether the primary-side controller is regulating the delivery of power to the mobile device's battery in a constant voltage or a constant current mode. For brevity, the primary-side controller is also denoted herein as a primary controller. Similarly, the secondary-side controller is also denoted herein as a secondary controller. The constant voltage mode occurs at an output voltage set by the mobile device. Similarly, the constant current mode occurs at an output current set by the mobile device. The charging occurs over a data interface cable such as a USB cable or a Lightning cable such that the mobile device may readily communicate the desired output voltage and output current limits to the secondary controller in the flyback converter through the data channel in the data interface cable. But the secondary controller is isolated from the primary controller by the flyback's transformer. To enable the secondary controller to communicate the output voltage and output current limits to the primary controller, the flyback converter includes a data channel coupled between the two controllers. For example, the primary-side and secondary-side controllers may be coupled through an independent data channel such as an optocoupler or a capacitor. The secondary controller transmits voltage pulses through the independent data channel to transmit the desired data to the primary controller as known in the art. The independent data channel is dedicated to the data delivery such that primary-only feedback techniques are used by the primary controller to measure the output voltage.

Alternatively, the secondary controller may use primary-only techniques to transmit the desired data. The resulting communication is denoted herein as primary-only data communication to distinguish it from data communication over a dedicated data channel. The secondary controller transmits data pulses in a primary-only data communication embodiment by selectively disabling the rectification of the secondary side current such as through shorting out an output diode or by pulsing a synchronous rectification transistor switch. The shorting of the output diode or the closing of the synchronous rectification switch cause a voltage pulse to be reflected onto the primary winding (and also an auxiliary winding if included). The primary controller senses the resulting pulsing of the drain voltage for its MOSFET power switch transistor (more generally, the pulsing of a power switch transistor terminal such as a bipolar junction power switch transistor terminal) to receive the transmitted data.

Regardless of whether the mobile device's output voltage and output current commands are communicated over an optocoupler or through primary-only data communication, the primary controller then begins to regulate the power switch cycling to attempt to first meet the desired output voltage. If despite this regulation of the power switch cycling, the secondary controller detects that the output voltage is lower than the desired output voltage by a threshold amount, the secondary controller detects that the regulation is a constant-current (CC) regulation. If the secondary-side controller detects that the desired output voltage is within a threshold amount (plus or minus) from the desired output voltage, the secondary controller detects that the regulation is a constant-voltage (CV) regulation.

The resulting constant current and constant voltage regulation detection by the secondary controller is quite advantageous in that the primary controller may readily determine that the output current is at the desired constant current limit using the equation of $I_{OUT}=kcc/2*Npri/Nsec/Rs$, where kcc is a coefficient for the constant current limit, Npri/Nsec is the transformer primary side to secondary side turns ratio, and Rs is the current sense resistor in series with the power MOSFET at the primary side. The kcc coefficient depends upon the regulation of the power switch transistor cycling such as the power switch transistor on time and also the transformer reset time. With regard to the regulation of the power switch cycling, the primary controller thus has a choice with regard to whether this regulation proceeds in the constant voltage or the constant current mode. In the constant-current mode, the primary controller then knows the resulting output current from the equation discussed above. Note that the use of a current sense resistor on the primary side is conventional and does not raise the power loss concerns that a secondary-side sense resistor would due to the reduced current though the primary-side sense resistor. Since the secondary controller knows the constant current limit because it receives this information from the mobile device, the secondary controller may be assured that the output current equals the constant current limit if the output voltage is below the desired output voltage limit by a threshold amount. The secondary controller may then assert a constant-current flag signal to alert the mobile device that the desired output current has reached the constant current limit. This is quite advantageous in that direct charging requires a knowledge of the output current by the flyback converter that would otherwise require a power-robbing secondary-side sense resistor.

The assertion of the constant-current flag signal (CC_Flag) is carried over the data channel in the data interface cable to the mobile device to signal to the mobile device that the output current equals the desired current limit (Icmd). The mobile device thus knows whether the power switch regulation is in a constant voltage or a constant current mode. By deliberating increasing or decreasing the output current limit or the output voltage limit (Vcmd), the mobile device can thus force the regulation in and out of constant current mode to effect the desired output current and output voltage from the flyback converter.

The secondary controller receives from the mobile device the requested current limit (Icmd) and the requested output voltage (Vcmd). The secondary controller can then transmit the desired current limit and requested output voltage to the primary controller as discussed above. The secondary controller then checks if the output voltage (Vbus for the USB cable) voltage reaches Vcmd. If Vbus is substantially equal to Vcmd, and the output current hasn't reached Icmd, the secondary controller does not assert the constant current flag to indicate that the output current is lower than the requested current limit. The de-assertion of the constant-current flag informs the mobile device that it can increase its voltage request. After receiving the increased voltage limit command, the secondary controller will then transmit the updated Vcmd accordingly to the primary controller. The primary controller then changes the power switch regulation so that the output voltage increases. But while the output voltage is less than the updated voltage limit, the secondary controller asserts the constant-current flag to signal to the mobile device that the output current equals the current limit (the flyback converter operating in a constant-current mode). When the output voltage reaches the voltage limit, the constant current flag is de-asserted to signal to the mobile device that the flyback converter is operating in the constant-voltage mode.

DETAILED DESCRIPTION

An efficient means of battery charging is provided in which the charging operation is controlled through current or voltage flags and a comparison system. The following discussion will be directed to a flyback converter power adapter (PA), such as a travel adapter or USB power supply, and a battery powered device (BPD), such as a phone, tablet, or USP powered device, but it will be appreciated that the resulting techniques may be widely applied to other types of PAs and BPDs without deviating from the scope of the invention.

Figure 1:
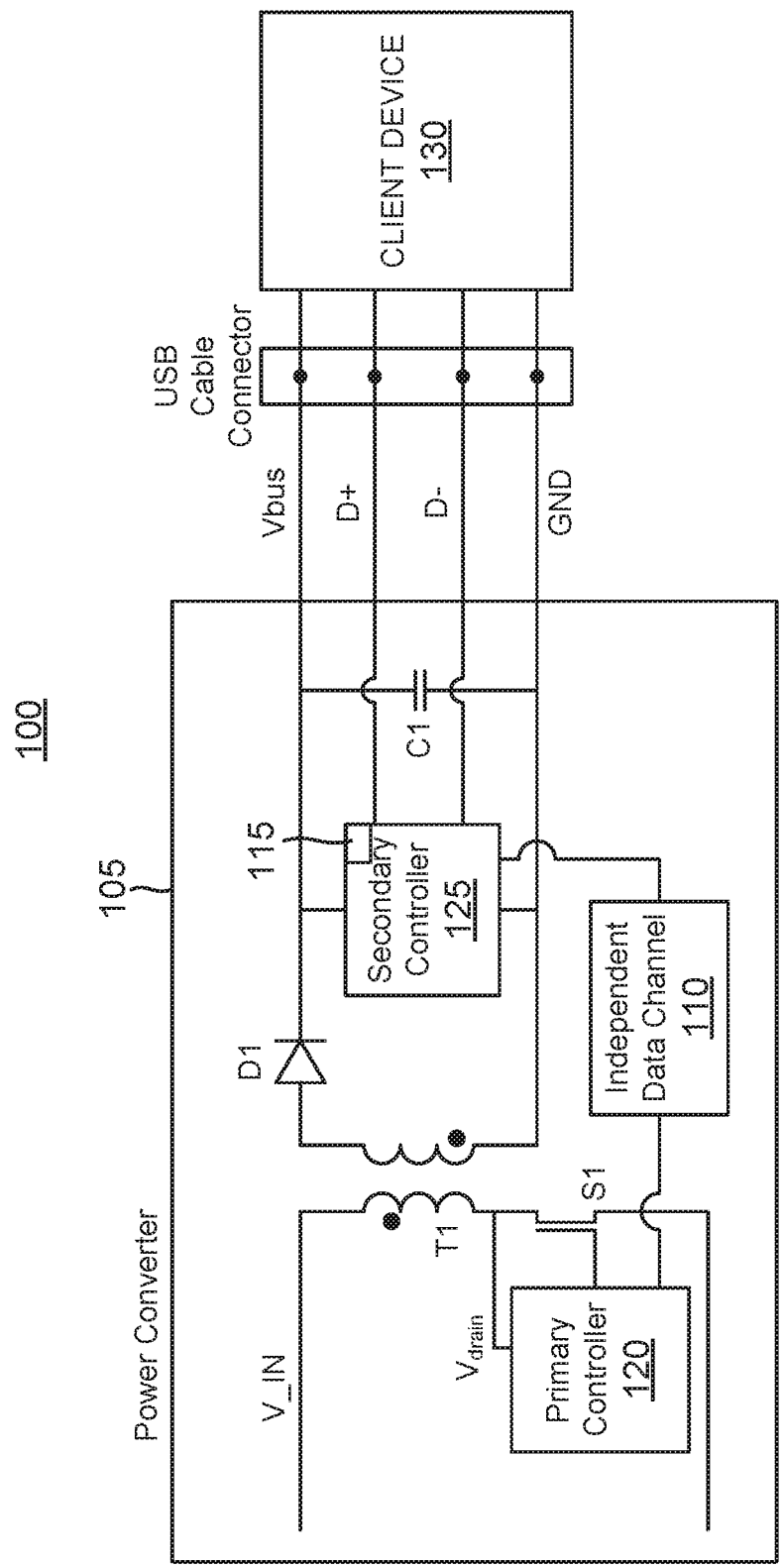
FIG. 1 illustrates an example battery charging system in accordance with an aspect of the disclosure.

An example charging system 100 including a flyback converter power adapter 105 and a mobile (client) device 130 is shown in FIG. 1. Flyback converter 105 includes a primary controller 120 that regulates the switching of a power switch transistor S1 that has a drain connected to a primary winding T1 of a transformer that receives an input voltage V_IN. Primary controller 120 senses the drain voltage Vdrain of the power switch transistor S1 to monitor an output voltage $V_{BUS}$ from flyback converter 105 as known in the primary-only feedback flyback converter arts. An output diode D1 prevents the secondary winding from conducting current while the primary current flows through primary winding T1. Alternatively, output diode D1 may be replaced by a synchronous rectifier switch.

A secondary controller 125 couples to data terminals such as terminals D+ and D− for a data interface cable/connector. Secondary controller 125 can thus receive a digitized output voltage limit command (Vcmd) and a digitized output current limit command (Icmd) from mobile (client) device 130. The following discussion will assume that the data interface cable is a USB cable but it will be appreciated that the direct charging disclosed herein may be practiced with other types of data interface cables such as the Lightning cable used for iPhones. The USB cable also includes an output voltage terminal and a ground (GND) terminal so that the output voltage and output current may be driven over the USB cable to mobile device 130. Secondary controller 125 includes an ADC 115 for digitizing the output voltage so that it may report the digitized output voltage to mobile device 130 over the D+ and D− data channels of the USB cable. Similarly, secondary controller 125 transmits the constant current flag over the D+ and D− data channels to mobile device 130. Secondary controller 125 transmits the desired output current limit and output voltage limit through an independent data channel 110 such as an optocoupler but it will be appreciated that primary-only data communication may be used as discussed above to transmit this data to primary controller 120.

As noted earlier, primary controller 120 may regulate the cycling of the power switch transistor S1 in a constant-current mode to provide an output current: $I_{OUT}=kcc/2*Npri/Nsec/Rs$, where kcc is a coefficient for the constant current limit, Npri/Nsec is the transformer primary side to secondary side turns ratio, and Rs is the current sense resistor (not illustrated) in series with the power switch transistor S1 at the primary side. The kcc coefficient depends upon the regulation of cycling of the power switch transistor S1 such as the power switch transistor on time and also the transformer reset time. In particular, primary controller 120 will attempt to drive the output voltage Vbus from flyback converter 105 to the desired output voltage limit such that it would operate in constant-voltage mode. But if the cycling of the power switch in striving to reach constant-voltage operation would lead to an output current that exceeds the current limit, primary controller 120 instead transitions to a constant-current operation at the desired current limit With regard to the constant-voltage and constant-current modes of operation, secondary controller 125 will monitor the output voltage $V_{BUS}$ through, e.g., ADC 115 to determine whether the output voltage is sufficiently close to the desired output voltage limit. For example, secondary controller 125 may be configured to monitor whether the output voltage is greater than the difference between the desired output voltage and a guard band margin voltage (Vmargin). Should secondary controller 125 determine that the output voltage is less than this difference, it asserts the constant current flag to signal to mobile device 130 that flyback converter 105 is operating in a constant-current mode. Conversely, should secondary controller 125 determine that the output voltage is greater than the difference between the output voltage and Vmargin, secondary controller 125 de-asserts the constant current flag to signal to mobile device 130 that flyback converter 105 is operating in a constant-voltage mode. Secondary controller 125 thus does not need a sense resistor to monitor the output current from flyback converter, which advantageously increases efficiency as compared to conventional direct charging techniques.

Although the assertion of the constant current flag to signal whether operation proceeds in a constant-current or constant-voltage mode of operation is convenient, note that the inclusion of the constant current flag is optional in that mobile device 130 itself may be configured to determine whether the output voltage is sufficiently close to the desired voltage limit. Mobile device 130 may thus determine on its own whether flyback converter 105 is operating in a constant-current or a constant-voltage mode of operation in alternative embodiments. Regardless of where the constant-current or constant-voltage determination is made, mobile device 130 may then proceed to alter the output current or output voltage limits to effect the desired charging profile for its battery. Such a charging profile may occur according to the three phases discussed above. Control during these three phases will be discussed further below.

In the first phase of battery charging, the battery is discharged such that the output voltage will gradually climb from the discharged state to some maximum voltage. The mobile phone will thus successively increase the desired voltage Vcmd during the first phase. The desired output current Icmd stays constant such as at some output maximum (e.g., 4 A). For a given value of Vcmd, the flyback converter will initially be in the constant-current mode until the output voltage reaches Vcmd, whereupon constant-voltage regulation proceeds. The mobile phone reacts to the transition to constant-voltage regulation by increasing Vcmd such that the flyback converter transitions to constant-current regulation. But as charge is built up in the battery, eventually the output voltage will again reach the revised value of Vcmd, whereupon Vcmd is again increased. In this fashion, the output voltage is successively increased during the first phase of battery direct charging.

Figure 2:
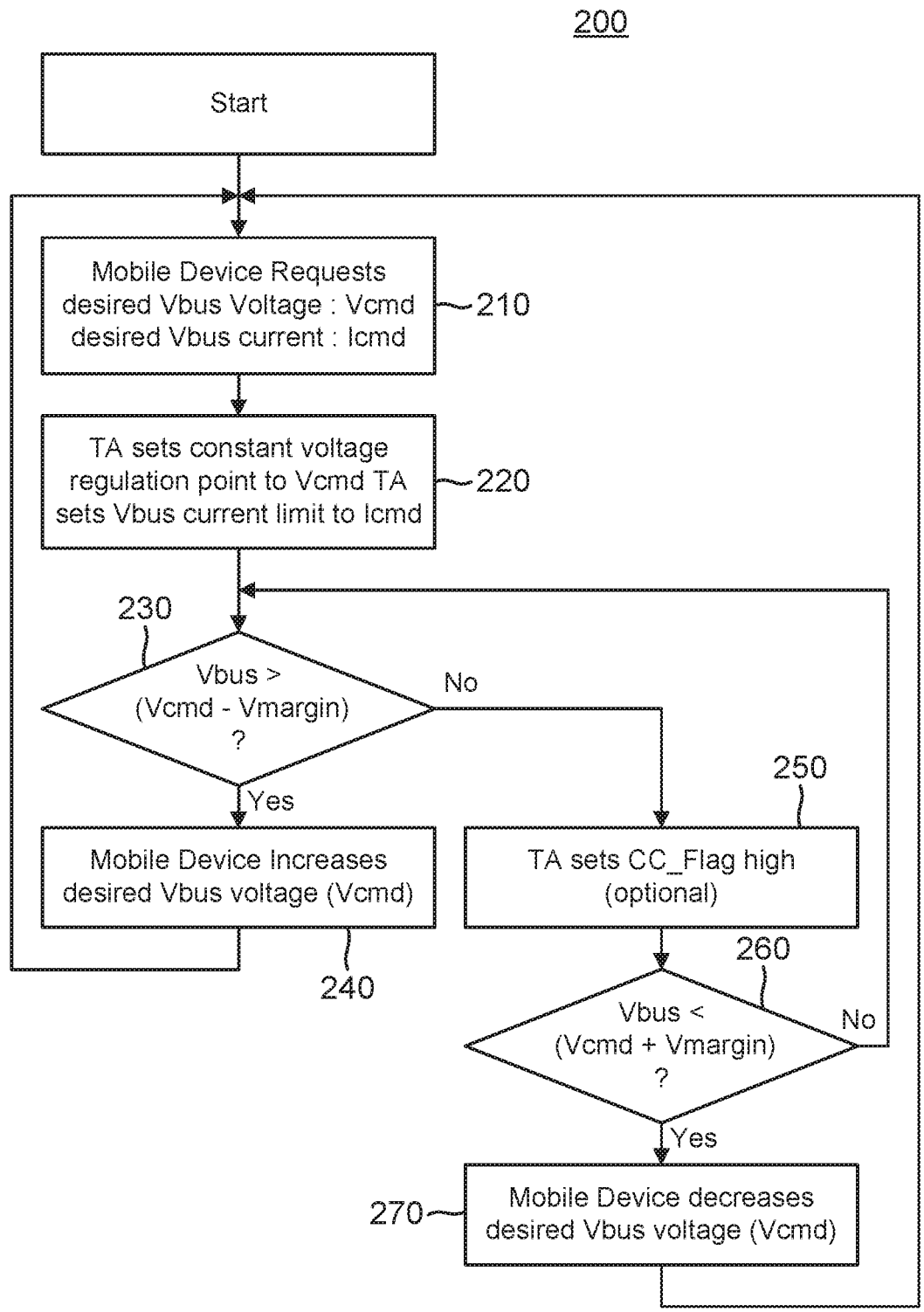
FIG. 2 is a flow chart for a first phase of a direct battery charging method.

The resulting control by mobile device 130 of the desired output voltage and output current limits during the first phase of direct battery charging is summarized in the flow chart shown in FIG. 2. As shown in FIG. 2, the mobile device (BPD) in an act 210 sends a request to the secondary controller for a desired Vbus Voltage (Vcmd) and a desired Vbus current (Icmd). In an act 220, the secondary controller communicates these values to the primary controller, which begins regulating the cycling of the power switch accordingly. In an act 230, the secondary controller (or the primary controller) compares Vbus to (Vcmd−Vmargin). Vmargin is used to avoid unnecessary adjustments due to Vbus ripple or other aberrations. The value of Vmargin can be a static or dynamic value based on the predicted or observed ripples or aberration in the Vbus or other components. It will be appreciated that the determination made by act 230 may be done by the secondary controller, the mobile device, the primary controller, or any other component or combination of components that can access Vbus information. If Vbus is greater than (Vcmd−Vmargin), the secondary controller may de-assert the constant-current flag to indicate that the flyback converter is no longer operating in the constant-current mode. In response, the mobile device increases Vcmd in an act 240, whereupon the method continues again at act 210.

If the Vbus voltage is less than (Vcmd−Vmargin), then the secondary controller can assert the constant-current flag in an act 250. In a subsequent act 260, Vbus is compared to (Vcmd−Vmargin2). If Vbus is greater than Vcmd minus Vmargin2, then the method returns to act 230. If Vbus is less than Vcmd minus Vmargin2, the mobile device decreases the desired Vcmd in an act 270.

Figure 3:
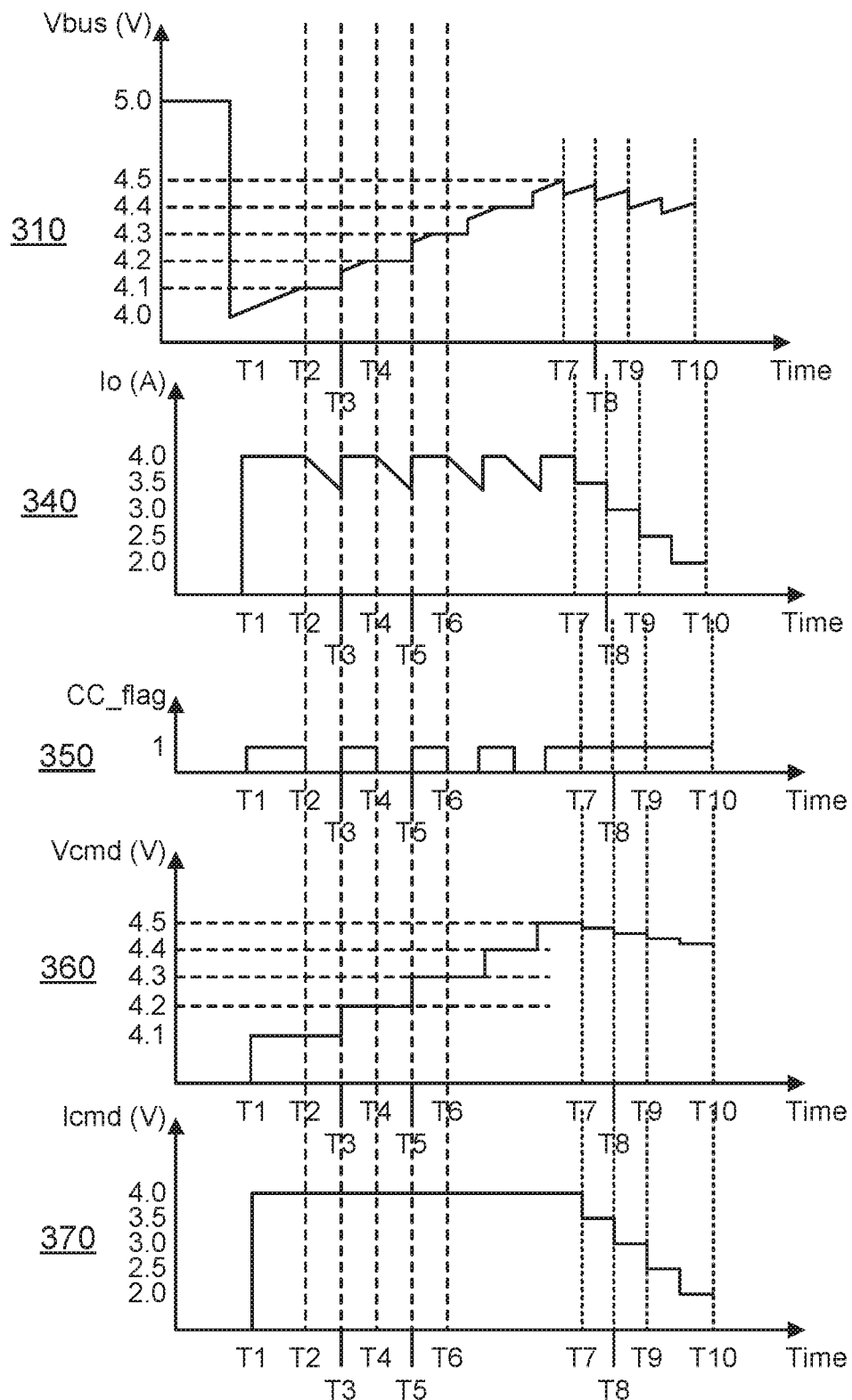
FIG. 3 illustrates waveforms for a direct battery charging system during the first and second phases of the direct battery charging in accordance with an aspect of the disclosure.

Once the Vcmd reaches a maximum amount for the first phase of direct battery charging, the direct battery charging method transitions to the second phase in which the desired output current Icmd is successively reduced. Various waveforms for system 100 during the second phase are shown in FIG. 3. A waveform 310 represents the output voltage Vbus. A waveform 340 represents the output current from the flyback converter. The constant-current flag is represented by waveform 350. Finally, Vcmd and Icmd are represented by waveforms 360 and 370, respectively. The second phase begins at time T1. At that time Vcmd equals 4.1 V whereas Icmd equals 4 A across the entire second phase (from time T1 through time T7). Since the output voltage Vbus is less than Vcmd at time T1, the regulation proceeds according to the constant-current mode of operation such that the constant-current flag is asserted at time T1. At time T2, the output voltage reaches Vcmd (in this example, Vmargin is negligible) such that the constant-current flag is de-asserted. Regulation proceeds in the constant-voltage mode of operation until time T3 whereupon the mobile device increases Vcmd to 4.2 V in response to the constant-current flag being de-asserted. Since the output voltage is less than Vcmd at time T3, regulation proceeds in the constant-current mode until time T4, at which point Vout equals Vcmd such that the constant-voltage mode resumes and the constant-current flag is de-asserted. At time T5, the mobile device reacts to the de-assertion of the constant-current flag by increasing Vcmd to 4.3 V. In this fashion, Vcmd is successively increased until Vbus reaches Vcmd equaling the maximum voltage of 4.5 V at time T7 to end the second phase.

Figure 4:
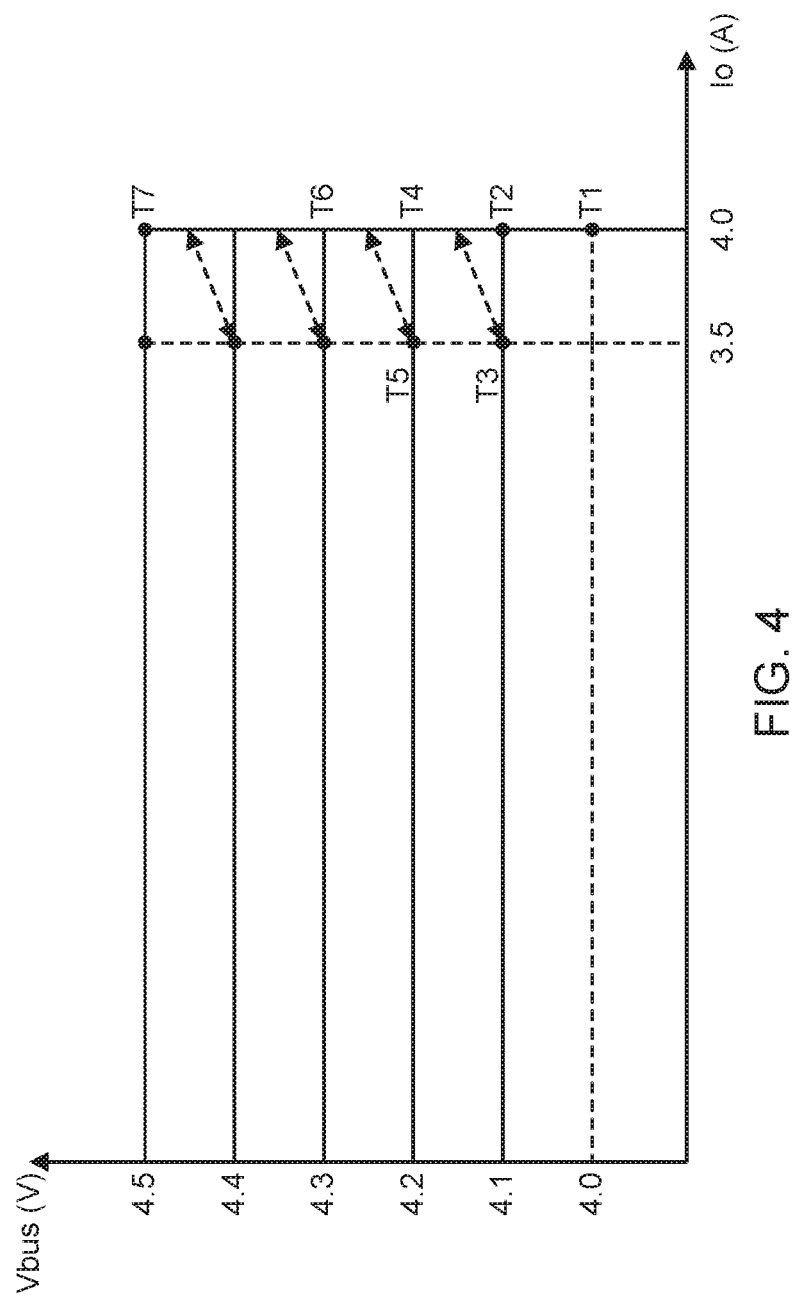
FIG. 4 illustrates the transition of the constant-voltage and constant-current modes of operation during the first phase of a direct battery charging in accordance with an aspect of the disclosure.

The resulting transitions between constant-voltage and constant-current regulation during the second phase are shown in FIG. 4. Constant-current operation occurs from time T1 to time T2 whereas constant-voltage operation occurs from times T2 to T3 (Vcmd equaling 4.1 V). In response to the increase in Vcmd to 4.2 V at time T3, the flyback converter pushes the regulation back into the constant-current mode until time T4. From times T4 to time T5, the regulation proceeds in constant-voltage mode with Vbus equaling 4.2 V. But Vcmd is increased to 4.3 V at time T5 so that constant-current regulation is eventually reached until time T6 at which point Vbus equals 4.3 V. Several more rounds of increasing Vcmd are then performed until the maximum voltage of 4.5 V is reached at time T7.

Referring again to FIG. 3, phase two operation proceeds from time T7 until time T10. At time T7, the mobile device reduces Vcmd slightly from 4.5 V while reducing Icmd more significantly from 4 A to 3.5 A. Given the reduction in Icmd, regulation proceeds in the constant-current mode until time T8, whereupon Vbus equals Vcmd. The mobile device again reduces Vcmd slightly whereas Icmd is reduced more greatly at time T8 from 3.5 A to 3 A. The mobile device continues to drop Icmd at time T9 until a minimum output current such as 2 A is reached at time T10. Since regulation is maintained in the constant-current mode across the second phase operation, the constant-current flag is asserted from time T7 to time T10. Phase 3 operation then proceeds as discussed further below.

Figure 5:
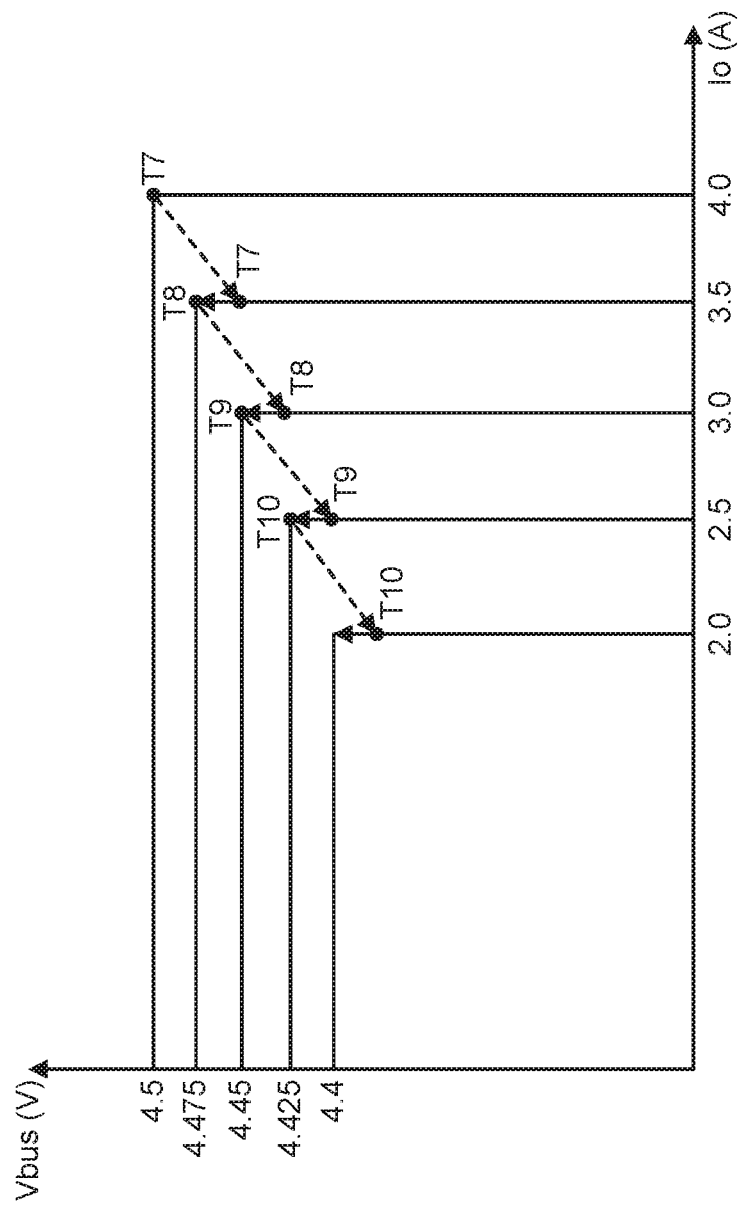
FIG. 5 illustrates the transition of the constant-voltage and constant-current modes of operation during the second phase of a direct battery charging in accordance with an aspect of the disclosure.

The resulting transitions between constant-current and constant-voltage operation for the second phase are shown in FIG. 5. At time T7, Icmd is reduced from 4 A to 3.5 A and Vcmd reduced from 4.5 V to 4.475 V. Regulation then proceeds in the constant-current mode until time T8, whereupon Vbus equals Vcmd. The mobile device reacts to the increase in Vbus at time T8 by reducing Icmd to 3 A and reducing Vcmd to 4.45. Operation then proceeds in the constant-current mode until Vbus reaches Vcmd at time T9. The mobile device reacts to the increase in Vbus at time T9 by reducing Vcmd to 4.425 and Icmd to 2.5 A. Operation then proceeds in the constant-current mode until Vbus reaches Vcmd at time T10, whereupon phase 3 operation begins.

Figure 6:
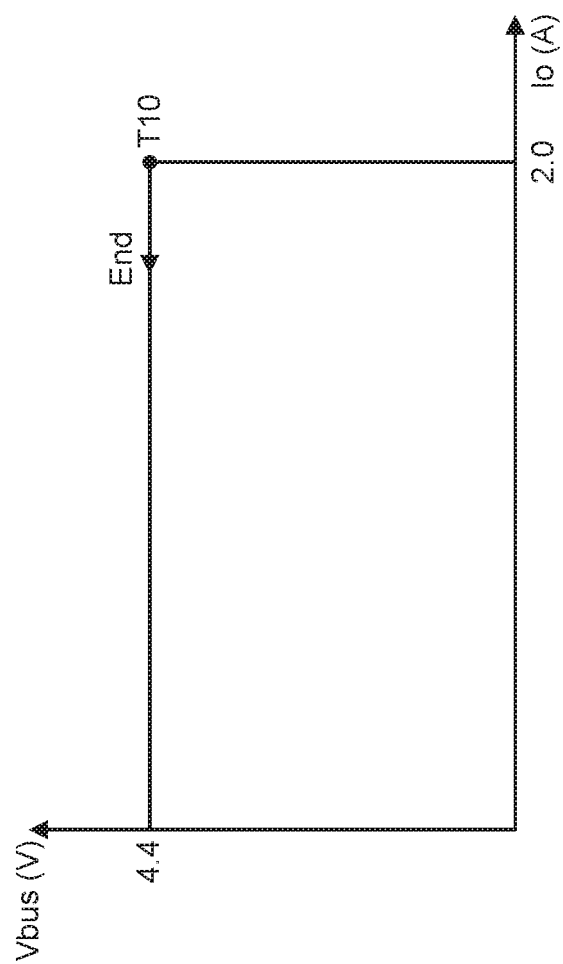
FIG. 6 illustrates the transition of the constant-voltage and constant-current modes of operation during the third phase of a direct battery charging in accordance with an aspect of the disclosure.

Phase 3 operation proceeds in a constant voltage mode during which time the output current continues to drop to maintain the constant-voltage regulation. The Icmd and Vcmd values are as set at the end of the second phase operation and need not be changed by the mobile device during phase 3 operation. The resulting constant-voltage/constant-current transition point is shown in FIG. 6. The output current continues to decline from 2 A at time T10 until the battery is fully charged and the end of the direct battery charging procedure is reached. The output voltage stays constant such as at 4.4 V during this final phase.

It will be appreciated that a constant-voltage flag could also be used in lieu of the constant-current flag. Such flags would be the inverse of each other. As those of some skill in this art will by now appreciate and depending on the particular application at hand, many modifications, substitutions and variations can be made in and to the materials, apparatus, configurations and methods of use of the devices of the present disclosure without departing from the scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method of directly charging a battery for a mobile device using a flyback converter that does not include a sense resistor in series with a secondary winding of a transformer, comprising:
   receiving at a secondary controller for the flyback converter over a data channel in a data interface cable, a desired output voltage command for setting a first output voltage limit and a desired output current command for setting a first output current limit;
   transmitting the desired output voltage command and the desired output current command from the secondary controller to a primary controller for the flyback converter;
   in the secondary controller, determining that the primary controller is regulating the cycling of the power switch according to a constant-current mode responsive to a determination by the secondary controller that the output voltage is less than the difference of the first output voltage limit and a voltage margin; and
   alerting the mobile device of the determination that the primary controller is in the constant-current mode.

2. The method of claim 1, further comprising:
   responsive to the alerting of the mobile device, receiving a revised output voltage command setting a revised output voltage limit; and
   regulating the power switch cycling responsive to the revised output voltage limit.

3. The method of claim 2, wherein the revised output voltage limit is greater than the first output voltage limit.

4. The method of claim 1, further comprising:
   digitizing the output voltage to form a digitized output voltage; and from the secondary controller, transmitting the digitized output voltage to the mobile device over the data channel in the data interface cable.

5. The method of claim 4, further comprising:
responsive to the digitized output voltage being sufficiently close to the first output voltage limit, transmitting from the mobile device over the data channel in the data interface cable to the secondary controller a revised output current limit command setting a second output current limit that is less than the first output current limit;
transmitting the revised output current limit command from the secondary controller to the primary controller; and
regulating the cycling of the power switch according to the second output current limit.

6. The method of claim 1, wherein transmitting the desired output voltage command and the desired output current command from the secondary controller to the primary controller comprises transmitting the desired output voltage command and the desired output current command over an optoisolator.

7. The method of claim 1, wherein transmitting the desired output voltage command and the desired output current command from the secondary controller to the primary controller comprises transmitting the desired output voltage command and the desired output current command by pulsing a synchronous rectifier switch.

8. The method of claim 1, wherein the data interface cable is a Universal Serial Bus cable.

9. The method of claim 1, wherein the data interface cable is a Lightning cable.

10. A flyback converter, comprising:
a primary controller configured to cycle a power switch in a constant-voltage mode responsive to an output current being less than a first output current limit and to cycle the power switch in a constant-current mode responsive to the output current equaling the first output current limit; and
a secondary, controller configured to receive a first output voltage limit and the first output current limit from a mobile device over a data channel in a data interface cable and to transmit the first output voltage limit and the first output current limit to the primary controller, wherein the secondary controller is further configured to transmit a constant-current flag signal to the mobile device responsive to the output voltage being less than a difference of the first output voltage limit and a voltage margin.

11. The flyback converter of claim 10, wherein the secondary controller is further configured to digitize the output voltage into a digitized output voltage and to transmit the digitized output voltage over the data channel in the data interface cable to the mobile device.

12. The flyback converter of claim 11, wherein the data interface cable is a Universal Serial Bus cable.

13. The flyback converter of claim 11, wherein the data interface cable is a Lightning cable.

14. The flyback converter of claim 11, wherein the secondary controller is further configured to receive a revised output current limit from the mobile device over the data channel in the data interface cable and to transmit the revised output current limit to the primary controller.

* * * * *